July 24, 1956
C. VAN DEVENTER III
2,755,825
SHUTTLE BINDER SUPPORTS FOR LOOMS
Filed Oct. 7, 1952
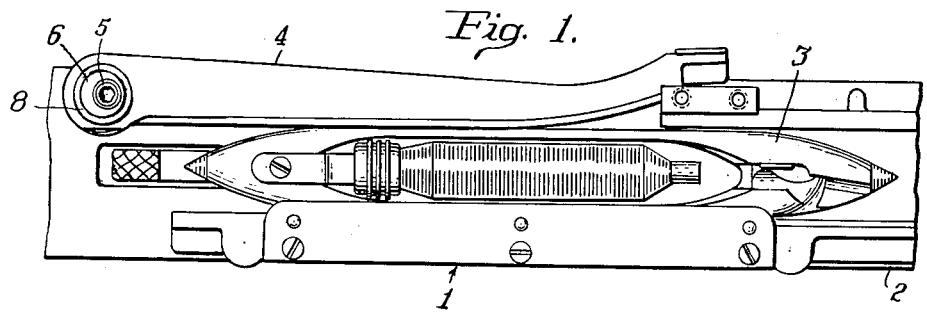
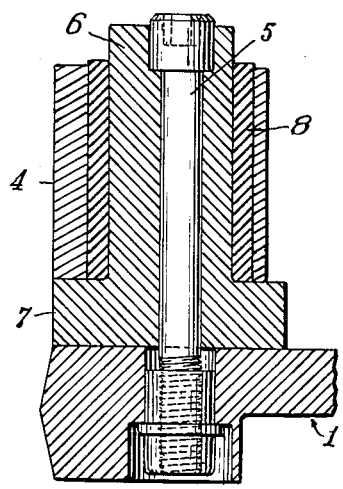
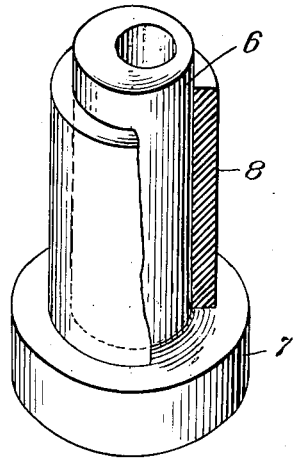
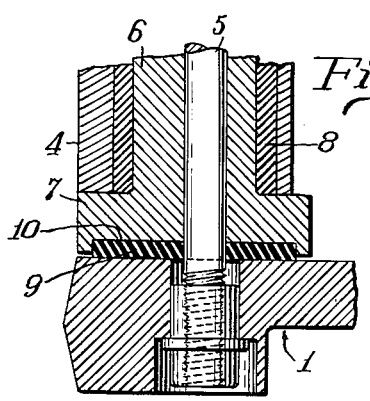
INVENTOR
Christopher Van Deventer III
BY *Cyrus Kehr & Smucker*
ATTORNEYS

United States Patent Office 2,755,825
Patented July 24, 1956

2,755,825

SHUTTLE BINDER SUPPORTS FOR LOOMS

Christopher Van Deventer III, Knoxville, Tenn., assignor to National Plastics, Inc., Knoxville, Tenn., a corporation of Delaware Application October 7, 1952, Serial No. 313,428

11 Claims. (Cl. 139—185)

This invention relates to improvements in shuttle binder supports for looms.

The usual binder for checking the shuttle of a loom is pivotally mounted on a pin or stud that is fixed to the lay or the shuttle box. Since the shuttle is forced into the shuttle box at high speed and with considerable force, its action on the binder creates a fast motion of the latter on its support. It has been the practice heretofore to mount the binder on the pivot pin or stud by means of a metal bushing with machined bearing surfaces in an effort to obtain smooth operation. This bearing could not be lubricated because of the danger of the lubricant coming into contact with the thread or yarn in the shuttle and warp. The lack of lubricant and the machined metal bearing surfaces was a dangerous practice because of the occurrence of fires in the loom as a result thereof.

Various attempts have been made to eliminate these objections, but these have not been satisfactory, nor have they fully accomplished the desired results. Consequently, the old practice of using metal bushings and machined surfaces still prevails since no satisfactory substitute has been found heretofore.

One object of this invention is to improve the construction of shuttle binder supports to provide for smoother operation of the binder without danger of heating and without likelihood of causing fire in the loom due to the action of the shuttle on the binder.

Another object of the invention is to provide for the incorporation in the binder bushing shim of a lubricant for the self-lubrication of the bearing without danger of getting the lubricant into contact with the thread in the loom, for smoother operation of the binder and complete heat dissipation.

Still another object of the invention is to provide for the lubrication of the shuttle binder support by incorporating in a porous metal shim and bushing a lubricant so as to provide self-lubrication for the bearing and support. The bearing may be constructed either of porous ferrous metal for the binder bushing, with a porous bronze shim, or of plastic material such as thermosetting phenolic plastic impregnated with graphite or other lubricant as a bushing and surrounded by a shim formed of phenolic laminated tube impregnated with a lubricant. This provides for self-lubrication of the bearing and complete heat dissipation, and yet without danger of contamination of the thread by the lubricant.

The invention is illustrated in one embodiment in the accompanying drawings in which:

Fig. 1 is a plan view of the shuttle box showing the invention applied thereto;

Fig. 2 is a cross-section through the shuttle binder support;

Fig. 3 is a perspective view of the binder bushing and shim detached; and

Fig. 4 is a cross-section through the shuttle binder support, showing a modification.

Referring to Fig. 1, the invention is shown applied to a conventional form of shuttle box, generally designated at 1, and provided on the loom lay 2 for receiving the shuttle 3.

At one side of the shuttle box 1 is a spring pressed binder 4, yieldably urged inward in the path of the shuttle 3 for the purpose of checking the shuttle as it is projected into the shuttle box 1. The binder 4 is in the form of an elongated bar or arm, made of wood or other suitable material, in the customary manner, the details of which vary for different loom manufacturers and need not be described herein as the invention may be used with any suitable form of binder.

The binder 4 is pivotally mounted at one end thereof on a pin or stud 5, suitably secured in a part of the shuttle box 1, one form of mounting being shown in Fig. 2 merely as an example. Any suitable form thereof may be used, as desired.

The stud 5 extends through a binder bushing 6, eccentrically thereof, in the form illustrated, which bushing 6 is provided with a flange 7 on the lower end thereof formed in one integral piece with the bushing. A shim 8 surrounds the bushing 6 between the latter and the bearing surface of the pivoted end of the binder 4.

According to this invention, the binder bushing 6 and shim 8 are formed of materials which do not require machining and are sufficiently porous so as to be impregnated with a suitable lubricant, and thereby will provide a self-lubricating bearing for the binder 4 on the pin or stud 5, and yet without danger of the lubricant coming into contact with the threads in the loom.

One example of this invention involves the use of porous ferrous metal for the binder bushing 6, and a porous bronze shim 8 surrounding the bushing and journaled thereon. Another example involves the use of a bushing formed of thermosetting phenolic plastic with a shim made of a phenolic laminated tube such as canvas laminated with phenolic formaldehyde. Such plastic materials may be made or processed by transfer molding, extrusion, or otherwise, but do not require machining, and the same is true of the porous metals mentioned. They are used in the same relatively rough shape as formed, without machining of the surfaces thereof.

These materials, either porous metals or plastics, as mentioned, may be impregnated with graphite, or other lubricant, in the shim or the bushing, or both, as desired, to provide for self-lubrication of the bearing support for the binder without the necessity for a machined bearing surface and without the danger of the lubricant contaminating the thread. At the same time, the bearing will completely dissipate the heat resulting from the operation of the binder by the shuttle, thus producing materially improved operating results at low cost of construction and solving many of the problems long recognized heretofore.

In many instances the supporting surface of the shuttle box 1 or lay 2 is uneven to such an extent that the flat bottom surface of the binder bushing 6 would be strained by a tightening of the bolt 5. This strain on some materials would cause a breakage of the flange 7 of the binder bushing or cause it to shift out of its true relation to the bolt or stud 5, which would cause a misalignment of the entire assembly.

This condition can be prevented by the use of a gasket or washer under the binder bushing 6, as indicated at 9 in Fig. 4. This gasket or washer 9 may be made of rubber, thermoplastic, or other suitable material that will conform to irregularities between the surfaces of the bushing 6 and the box 1 or lay 2 on which said bushing is mounted.

If desired, the gasket or washer 9 may be held in place by a recess 10 in one of the opposed surfaces, as shown in Fig. 4.

While the invention has been illustrated and described in certain embodiments, it is recognized that variations and changes may be made therein without departing from the invention as set forth in the claims.

I claim:

1. In a loom having a lay and a shuttle box thereon adapted to receive a shuttle, a binder carried by the lay, a stud mounted on the lay to support the binder, the combination of a bushing surrounding the stud, and a shim interposed between the bushing and the binder and journaled on the bushing, said bushing and shim containing a self-lubricating material incorporated therein.

2. In a loom having a lay and shuttle box thereon adapted to receive a shuttle, a binder carried by the lay, a stud mounted on the lay to support the binder, the combination of a bushing surrounding the stud, and a shim interposed between the bushing and the binder and journaled on the bushing, said shim being impregnated with a lubricant for lubricating the mounting of the binder on the bushing.

3. In a loom having a lay and shuttle box thereon adapted to receive a shuttle, a binder carried by the lay, a stud mounted on the lay to support the binder, the combination of a bushing surrounding the stud, and a shim interposed between the bushing and the binder and journaled on the bushing, said bushing and shim comprising porous materials impregnated with a lubricant and having non-machined bearing surfaces.

4. In a loom having a lay and shuttle box thereon adapted to receive a shuttle, a binder carried by the lay, a stud mounted on the lay to support the binder, the combination of a bushing surrounding the stud, and a shim interposed between the bushing and the binder and journaled on the bushing, said bushing being formed of porous ferrous metal and the shim being formed of porous bronze impregnated with a self-lubricant material.

5. In a loom having a lay and a shuttle box thereon adapted to receive a shuttle, a binder carried by the lay, a stud mounted on the lay to support the binder, the combination of a bushing surrounding the stud, and a shim interposed between the bushing and the binder and journaled on the bushing, said bushing being formed of a phenolic plastic and the shim being formed of phenolic laminated material impregnated with a lubricant.

6. In a loom having a lay and a shuttle box thereon adapted to receive a shuttle, a binder carried by the lay, a stud mounted on the lay to support the binder, the combination of a bushing surrounding the stud, a shim interposed between the bushing and the binder and journaled on the bushing, and a gasket interposed between the bushing and the lay and conformable to irregularities between the surfaces of the bushing and lay.

7. In a shuttle box for a loom having a binder for a shuttle, means for mounting the binder for pivotal movement with respect to the shuttle box and including a binder bushing, a pivot pin secured rigidly to the shuttle box and securing the binder bushing thereto in rigid relation, a shim journaled on the binder bushing and interposed between the latter and the binder, said shim and bushing having non-machined opposed surfaces, and one of said members being impregnated with a lubricant and providing a self-lubricant bearing for the binder.

8. A shuttle binder support comprising an upright binder bushing, a pin rigidly securing the binder bushing in position and extending axially therethrough, a shim surrounding the binder bushing and journaled thereon adapted to be secured to the binder bushing and to support the shim on the bushing, said bushing and shim having opposed non-machined bearing faces in surface contact with each other, one of said members being porous and impregnated with a lubricant self-contained therein, said binder bushing having an outwardly turned flange on the lower end thereof underlying the shim, and a gasket beneath the binder bushing and having the latter seated thereon yieldably supporting the binder bushing.

9. In a loom having a lay and a shuttle box thereon adapted to receive a shuttle, a binder carried by the lay, a stud mounted on the lay to support the binder, the combination of a bushing surrounding the stud, and a shim interposed between the bushing and the binder and journaled on the bushing, one of said bushing and shim containing a self-lubricating material incorporated therein.

10. In a loom having a lay and shuttle box thereon adapted to receive a shuttle, a binder carried by the lay, a stud mounted on the lay to support the binder, the combination of a bushing surrounding the stud, and a shim interposed between the bushing and the binder and journaled on the bushing, one of said bushing and shim comprising a porous material impregnated with a lubricant and having a non-machined bearing surface.

11. A shuttle binder support comprising a binder bushing having a surrounding shim journaled thereon, at least one of said members having a non-machined porous bearing surface and being impregnated with a lubricant, said bushing being formed of phenolic plastic and the shim being formed of phenolic laminated tube.

References Cited in the file of this patent

UNITED STATES PATENTS

| 876,005 | Mason | Jan. 7, 1908 |
| 1,392,173 | Kempton | Sept. 27, 1921 |
| 2,252,351 | Paulus | Aug. 12, 1941 |
| 2,470,264 | Richardson | May 17, 1949 |
| 2,525,129 | Hageman | Oct. 10, 1950 |
| 2,669,491 | Haller | Feb. 16, 1954 |
| 2,675,283 | Thompson | Apr. 13, 1954 |

FOREIGN PATENTS

| 553,673 | Great Britain | June 1, 1943 |
| 591,319 | Great Britain | Aug. 14, 1947 |
| 848,499 | France | July 24, 1939 |

OTHER REFERENCES

"Product Engineering," September 1952; pages 125 and 126.